(12) United States Patent
Shioda et al.

(10) Patent No.: US 9,443,537 B2
(45) Date of Patent: Sep. 13, 2016

(54) VOICE PROCESSING DEVICE AND VOICE PROCESSING METHOD FOR CONTROLLING SILENT PERIOD BETWEEN SOUND PERIODS

(71) Applicant: FUJITSU LIMITED, Kawasaki-shi, Kanagawa (JP)

(72) Inventors: Chisato Shioda, Kawasaki (JP); Taro Togawa, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 14/269,389

(22) Filed: May 5, 2014

(65) Prior Publication Data
US 2014/0350937 A1  Nov. 27, 2014

(30) Foreign Application Priority Data
May 23, 2013 (JP) ................................. 2013-109273

(51) Int. Cl.
*G10L 25/78* (2013.01)
*G10L 21/057* (2013.01)
*G09B 19/06* (2006.01)

(52) U.S. Cl.
CPC ............... *G10L 25/78* (2013.01); *G09B 19/06* (2013.01); *G10L 21/057* (2013.01)

(58) Field of Classification Search
None
See application file for complete search history.

(56) References Cited

U.S. PATENT DOCUMENTS

| 5,305,420 A | 4/1994 | Nakamura et al. |
| 5,487,671 A * | 1/1996 | Shpiro ............... G09B 7/04 434/185 |
| 2003/0004723 A1* | 1/2003 | Chihara ............... G10L 13/08 704/260 |
| 2005/0192812 A1* | 9/2005 | Buchholz ............ H04J 3/0632 704/278 |
| 2005/0288923 A1* | 12/2005 | Kok ................... G10L 21/0208 704/226 |
| 2006/0149558 A1 | 7/2006 | Kahn et al. |
| 2006/0235688 A1 | 10/2006 | Bicego et al. |
| 2007/0185704 A1* | 8/2007 | Yoshimura ............ G10L 17/26 704/10 |
| 2012/0010869 A1* | 1/2012 | McCarley ........... G06F 17/2818 704/3 |
| 2012/0035922 A1* | 2/2012 | Carroll ................ G10L 21/045 704/231 |

FOREIGN PATENT DOCUMENTS

| JP | 63-213069 | 9/1988 |
| JP | 05-80796 | 4/1993 |
| JP | 09-134195 | 5/1997 |
| JP | 10-133678 | 5/1998 |
| JP | 2005-258849 | 9/2005 |
| JP | 2012-003090 | 1/2012 |
| WO | 02/49002 A1 | 6/2002 |

OTHER PUBLICATIONS

Extended European Search Report dated Jul. 1, 2014 in corresponding European Patent Application No. 14167181.8.
(Continued)

*Primary Examiner* — Barbara Reinier
(74) *Attorney, Agent, or Firm* — Staas & Halsey LLP

(57) ABSTRACT

A voice processing device includes a processor; and a memory which stores a plurality of instructions, which when executed by the processor, causing the processor to execute: acquiring an input voice; detecting a sound period included in the input voice and a silent period adjacent to a back end of the sound period; calculating a number of words included in the sound period; and controlling a length of the silent period according to the number of words.

18 Claims, 12 Drawing Sheets

(56) References Cited

OTHER PUBLICATIONS

"Listening Power in Second Language and Working Memory" transactions No. 40, Department of English Literature, Graduate School of Literature, Seijo University, Translation of relevant parts, pp. 78 to pp. 80, line 14.

"A Method of Vowel Recognition in connected Speech Using the Mutual Relation of Vowels", The Transactions of the Institute of Electronics, Information, and Communication Engineers, D-II vol. J72-D-II No. 6, pp. 837-845.

"Use of Correlation between Pitch and Spectral Parameters for HMM Phoneme Recognition" Technical Reports of the Institute of Television Engineers, 15 (54), p. 15-20 Abstract.

European Office Action dated Aug. 4, 2015 in corresponding European Patent Application No. 14167181.8.

* cited by examiner

VOICE PROCESSING DEVICE AND VOICE PROCESSING METHOD FOR CONTROLLING SILENT PERIOD BETWEEN SOUND PERIODS

CROSS-REFERENCE TO RELATED APPLICATION

This application is based upon and claims the benefit of priority of the prior Japanese Patent Application No. 2013-109273, filed on May 23, 2013, the entire contents of which are incorporated herein by reference.

FIELD

The embodiments discussed herein are related to a voice processing device, a voice processing method, and a voice processing program that that control, for example, input signals.

BACKGROUND

In response to recent progress in information processing apparatus development and in internationalization, there are an increasing number of chances to view and listen to content in a second language and to make a call in the second language through a telephone call application installed in a personal computer. In these situations, methods are disclosed by which voice signals in a second language, which are an example of input signals, are controlled so that the voice signals are made easy to listen. In, for example, Japanese Laid-open Patent Publication No. 10-133678, a technology is disclosed that makes an input voice easy to understand by extracting a sound period from a voice signal and adding a silent period to the back end of the sound period. It is known that the user usually performs repetitive endophasia in which the user reads back a word that the user has heard in a hard-to-understand second language through an internal speech with no audible vocalization (see Sinozuka Katsumasa, "Listening Power in Second language and Working Memory" transactions No. 40, 2008 at Department of English literature, Graduate School of Literature, Seijo University, for example). Thus, to understand a second language, it is important to ensure silent periods used in repetitive endophasia.

SUMMARY

In accordance with an aspect of the embodiments, a voice processing device includes a processor; and a memory which stores a plurality of instructions, which when executed by the processor, causing the processor to execute: acquiring an input voice; detecting a sound period included in the input voice and a silent period adjacent to a back end of the sound period; calculating a number of words included in the sound period; and controlling a length of the silent period according to the number of words.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Examples of a voice processing device, a voice processing method, and a voice processing program in an embodiment will be described with reference to the drawings. These examples do not limit the disclosed technology.

(First Embodiment)

Figure 1:
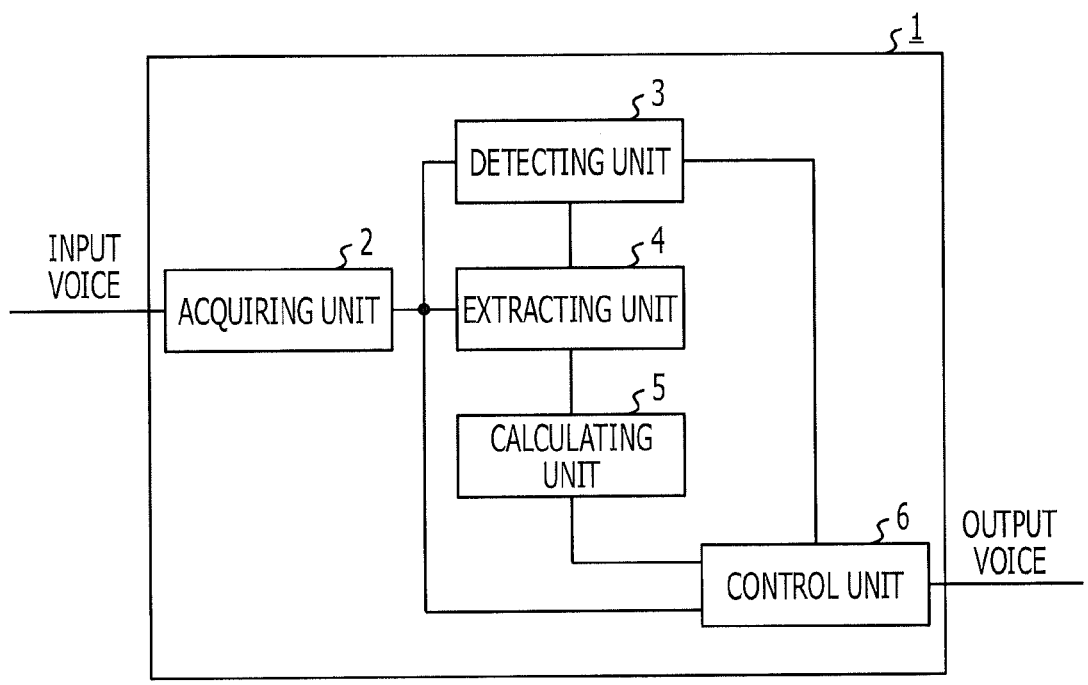
FIG. 1 is a functional block diagram of a voice processing device in a first embodiment.

FIG. 1 is a functional block diagram of a voice processing device 1 in a first embodiment. The voice processing device 1 includes an acquiring unit 2, a detecting unit 3, an extracting unit 4, a calculating unit 5, and a control unit 6.

The acquiring unit 2 is, for example, a wired logic hardware circuit. Alternatively, the acquiring unit 2 may be a functional module implemented by a computer program executed in the voice processing device 1. The acquiring unit 2 acquires an input voice through, for example, a wired circuit or a wireless circuit. The acquiring unit 2 may acquire an input voice from, for example, a microphone (not illustrated) that is connected to or placed in the voice processing device 1. Although the input voice is, for example, in English, it may be in another language. Although the input voice is, for example, in a second language of the user, it may be in the mother language of the user. As described above, to understand a second language, it is important to ensure silent periods used in repetitive endophasia. This is because, to understand the mother language as well, ensuring silent periods used in repetitive endophasia is assumed to be effective (particularly when the user is an elderly speaking person or a young child). In the first example, it is assumed for convenience of explanation, that the mother language of the user is Japanese and input voices are in English. The acquiring unit 2 outputs the acquired input voice to the detecting unit 3, extracting unit 4, and control unit 6.

The detecting unit 3 is, for example, a wired logic hardware circuit. Alternatively, the detecting unit 3 may be a functional module implemented by a computer program executed in the voice processing device 1. The detecting unit 3 receives an input voice from the acquiring unit 2. The detecting unit 3 detects an exhalation period, which indicates a sound period included in the input voice. The exhalation period continues from when the speaking person inhales and starts a speech until the speaking person inhales again (in other words, the exhalation period is a period between a first breath and a second breath or a period during which a speech is continued). The detecting unit 3 detects an average signal-to-noise ratio (SNR), which is a ratio of signal power to noise, from, for example, a plurality of frames included in the input voice so that a period with an average SNR that satisfies a prescribed condition may be detected as a sound period (in other words, an exhalation period). The detecting unit 3 also detects an inhalation period indicating a silent period adjacent to the back end of a sound period included in the input voice. The detecting unit 3 may detect, for example, a period with an average SNR that does not satisfy the prescribed condition as a silent period (in other words, an inhalation period). The detecting unit 3 outputs the detected sound period to the extracting unit 4, and also outputs the sound period and the silent period to the control unit 6.

Figure 2:
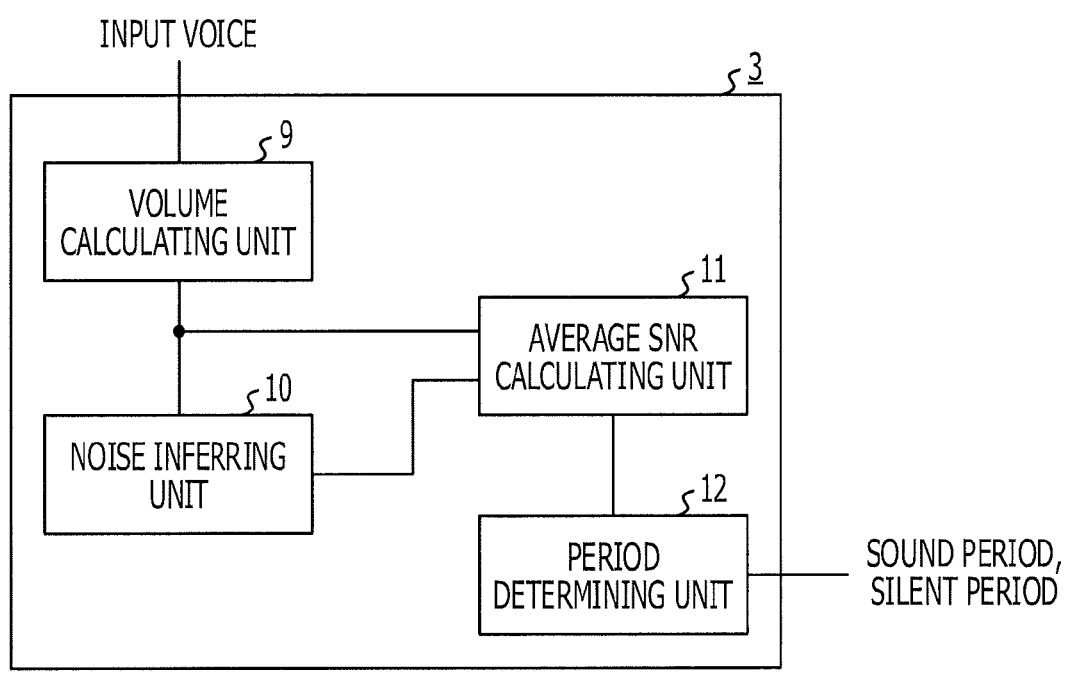
FIG. 2 is a functional block diagram of a detecting unit in an embodiment.

Now, processing by the detecting unit 3 to detect the sound period and silent period will be described in detail. FIG. 2 is a functional block diagram of the detecting unit 3 in an embodiment. The detecting unit 3 includes a volume calculating unit 9, noise inferring unit 10, an average SNR calculating unit 11, and a period determining unit 12. However, the detecting unit 3 may not include the volume calculating unit 9, noise inferring unit 10, average SNR calculating unit 11, and period determining unit 12; the functions of these units may be implemented by one or a plurality of wired logic hardware circuits. Alternatively, the functions of these units included in the detecting unit 3 may be implemented by functional modules implemented by a computer program executed in the voice processing device 1, instead of the above wired logic hardware circuits.

In FIG. 2, an input voice is input through the detecting unit 3 to the volume calculating unit 9. The volume calculating unit 9 includes a buffer or cache (not illustrated) with a length m. The volume calculating unit 9 calculates the volume of each frame included in the input voice and the outputs the calculated volume to the noise inferring unit 10 and average SNR calculating unit 11. The length of each frame included in the input voice is, for example, 0.2 ms. The volume S of each frame may be calculated according to the following equation.

$$S(f) = \sum_{t=f*M}^{(f+1)*M-1} c(t)^2 \quad \text{(Eq. 1)}$$

where f is a frame number sequentially assigned to one frame, starting from a first frame at the input of acoustic frames included in the input voice (f is an integer equal to or more than 0), M is the time length of one frame, t is time, and c(t) is an amplitude (electric power) of the input voice.

The noise inferring unit 10 receives the volume S(f) of each frame from the volume calculating unit 9. The noise inferring unit 10 infers noise in each frame and outputs an inferred noise result to the average SNR calculating unit 11. In noise inference for each noise by the noise inferring unit 10, a first noise inference method or a second noise inference method described below, for example, may be used.

(First Noise Inference Method)

The noise inferring unit 10 may use the following equation to infer noise level (electric power) N(f) of frame f according to volume S(f) in frame f, volume S(f−1) in previous frame f−1, and noise level N(f−1).

$$N(f) = \begin{cases} \alpha \cdot N(f-1) + \\ (1-\alpha) \cdot S(f), & (\text{when}|S(f-1) - S(f)| < \beta) \\ N(f-1), & (\text{other than the above}) \end{cases} \quad \text{(Eq. 2)}$$

where α and β each are a constant. They may be experimentally determined. For example, α may be 0.9 and β may be 2.0. Initial value N(f−1) of the noise electric power may also be experimentally determined. If, in the above equation in (Eq. 2), a change in volume S(f) of frame f from volume S(f−1) of the previous frame f−1 is smaller than the fixed value β, noise electric power N(f) of frame f is updated. If the change in volume S(f) of frame f from volume S(f−1) of the previous frame f−1 is equal to or more than fixed value β, noise electric power N(f−1) of the previous frame f−1 is taken as noise electric power N(f) of frame f. The noise electric power N(f) may be referred to as the above inferred noise result.

(Second Noise Inference Method)

The noise inferring unit 10 may use the following equation in (Eq. 3) to update the noise level according to a ratio of volume S(f) of frame f to noise electric power N(f−1) of the previous frame f−1.

$$N(f) = \begin{cases} \alpha \cdot N(f-1) + \\ (1-\alpha) \cdot S(f), & (\text{when } S(f) < \gamma \cdot N(f-1)) \\ N(f-1), & (\text{other than the above}) \end{cases} \quad \text{(Eq. 3)}$$

where γ is a constant. It may be experimentally determined. For example, γ may be 2.0. Initial value N(f−1) of the noise electric power may also be experimentally determined. If, in the above equation in (Eq. 3), volume S(f) of frame f is not a fixed times γ or more noise electric power N(f−1) of the previous frame f−1, noise electric power N(f) of frame f is updated. If volume S(f) of frame f is a fixed times γ or more noise electric power N(f−1) of the previous frame f−1, noise electric power N(f−1) of the previous frame f−1 is taken as noise electric power N(f) of frame f.

The average SNR calculating unit 11 in FIG. 2 receives volume S(f) of each frame from the volume calculating unit 9 and also receives noise electric power N(f) of each frame, which is an inferred noise result, from the noise inferring unit 10. The average SNR calculating unit 11 has a cache or a memory (not illustrated) to retain volume S(f) and noise electric power N(f) for L previous frames. The average SNR calculating unit 11 uses the following equation to calculate an average SNR in a time (in frames) during which an analysis is performed, and outputs the calculated average SNR to the period determining unit 12.

$$SNR(f) = \frac{1}{L} \sum_{i=0}^{L-1} \frac{S(f-i)}{N(f-i)} \quad \text{(Eq. 4)}$$

L may be a value larger than a general length of a double consonant; it may be, for example, the number of frames equivalent to 0.5 ms.

The period determining unit 12 receives the average SNR from the average SNR calculating unit 11. The period determining unit 12 has a buffer or a memory (not illustrated) to retain a flag f_breath, which indicates whether a preprocessing frame processed by the period determining unit 12 is a sound period (in other words, an inhalation period). The period determining unit 12 uses the following equation in (Eq. 5) to detect the beginning tb of a sound period according to the average SNR and f_breath and uses the following equation in (Eq. 6) to detect the back end to of the sound period.

$$tb = f \times M \quad \text{(Eq. 5)}$$

(when the f_breath flag does not indicate that the preprocessing frame is included in a sound period and SNR(f) is greater than $TH_{SNR}$)

$$te = f \times M - 1 \quad \text{(Eq. 6)}$$

(when the f_breath flag indicates that the preprocessing frame is included in a sound period and SNR(f) is smaller than $TH_{SNR}$)

where $TH_{SNR}$ is a threshold to regard that frame f processed by the period determining unit 12 is not noise. The threshold, which may be referred to as the first threshold, may be experimentally determined. The period determining unit 12 may also detect a period, in the input voice, that is not a sound period as a silent period. The period determining unit 12 outputs sound periods and silent periods detected according to the above equations in (Eq. 5) and (Eq. 6) to the extracting unit 4 and control unit 6 through the detecting unit 3.

Figure 3:
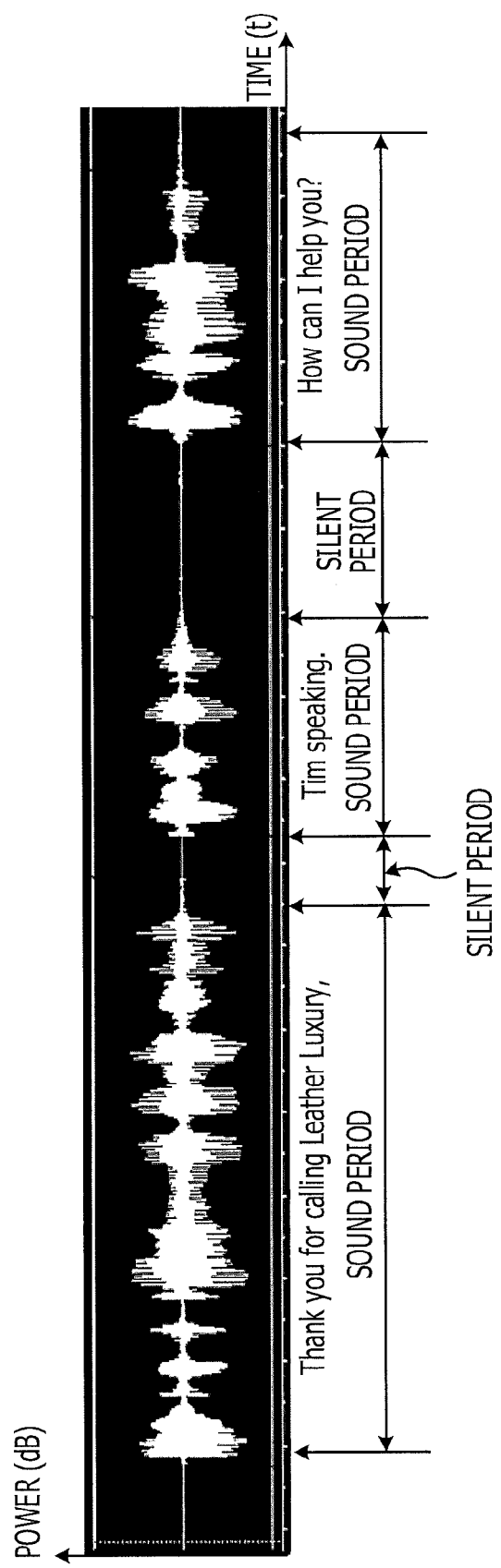
FIG. 3 illustrates sound periods and silent periods detected by the detecting unit.

FIG. 3 illustrates sound periods and silent periods detected by the detecting unit 3 with time on the horizontal axis and the volume (amplitude) of input voice on the vertical axis. Sound periods are detected from periods in which "Thank you for calling Leather Luxury.", "Tim speaking", and "How can I help you?" are spoken. A period following the back end of each sound period is detected as a silent period. As illustrated in FIG. 3, in detection of sound periods by the detecting unit 3 disclosed in the first example, noise is learned according to background noise and sound periods are identified according to the SNR. Thus, it is possible to suppress a sound period from being detected mistakenly due to background noise. Since an average SNR is obtained from a plurality of frames, the detecting unit 3 is advantageous in that even if a silent period momentarily occurs in a sound period, the sound period may be extracted as a continuous sound period.

The extracting unit 4 in FIG. 1 is, for example, a wired logic hardware circuit. Alternatively, the extracting unit 4 may be a functional module implemented by a computer program executed in the voice processing device 1. The extracting unit 4 receives an input voice from the acquiring unit 2 and also receives a sound period from the detecting unit 3. The extracting unit 4 extracts the acoustic features of the input voice included in the sound period. Examples of the acoustic features include the number of moras (vowel sounds) and the number of times a change in power with time reaches a prescribed value or more. The number of times a change in power with time reaches a prescribed value or more will be referred to below as the number of sudden power changes.

To recognize the number of moras, various known technologies may be used. For examples, technologies disclosed in Makino et al. "A method of vowel recognition in connected speech using the mutual relation of vowels", The transactions of The Institute of Electronics, Information, and Communication Engineers, D Vol. J72-D2 No. 6, pp. 837-845 and Singer et al., "Use of Correlation between Pitch and Spectral Parameters for HMM Phoneme Recognition" Technical Reports of The Institute of Television Engineers, 15 (54), pp. 15-20, Sep. 27, 1991. The extracting unit 4 outputs the number of moras included in the sound period to the calculating unit 5 as acoustic features.

Figure 4:
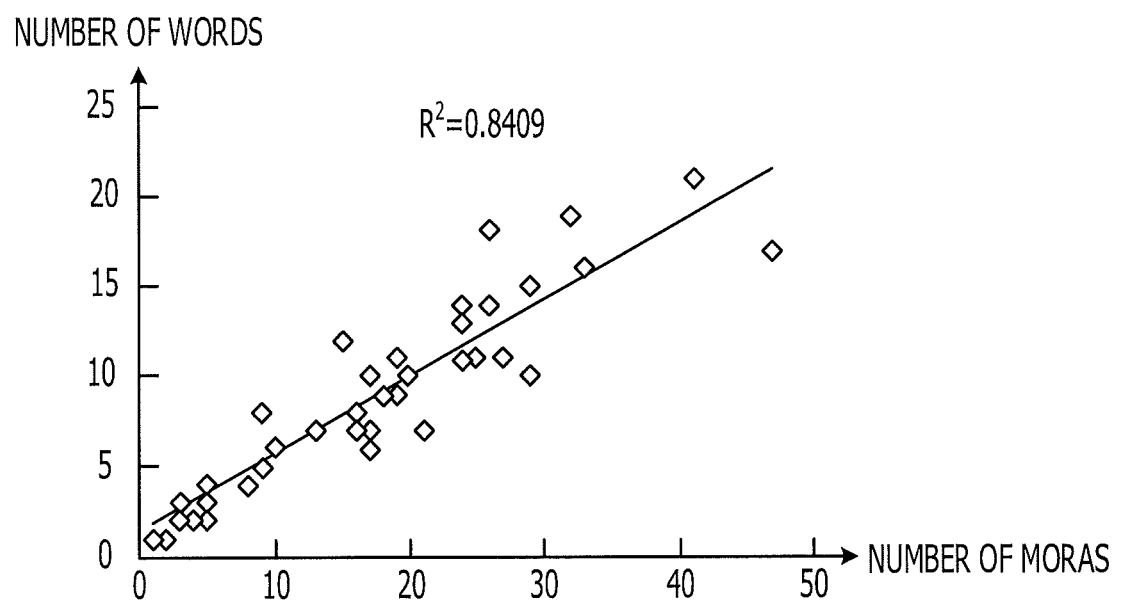
FIG. 4 illustrates a relationship between the number of moras, which are an example of acoustic features, and the number of words.

The calculating unit 5 is, for example, a wired logic hardware circuit. Alternatively, the calculating unit 5 may be a functional module implemented by a computer program executed in the voice processing device 1. The calculating unit 5 receives, from the extracting unit 4, the acoustic features included in the sound period detected by the detecting unit 3. The calculating unit 5 calculates the number of words included in the sound period according to the acoustic features. FIG. 4 illustrates a relationship between the number of moras, which is an example of acoustic features, and the number of words. In the relationship in FIG. 4, the number of words was manually extracted from a plurality of exemplary sentences, and the number of moras associated with each word was also manually extracted. As illustrated in FIG. 4, it was clarified through verification by the inventors that the value of the coefficient $R^2$ of correlation between the number of words and the number of moras is 0.8 or more, indicating that the correlation is strong. The calculating unit 5 stores a correspondence table between the number of words and the number of moras in, for example, a cache or a memory (not illustrated) included in the calculating unit 5. The calculating unit 5 may calculate the number of words included in the sound period with reference to the correspondence table. The calculating unit 5 outputs the calculated number of words to the control unit 6.

The control unit 6 in FIG. 1 is, for example, a wired logic hardware circuit. Alternatively, the control unit 6 may be a functional module implemented by a computer program executed in the voice processing device 1. The control unit 6 receives an input voice from the acquiring unit 2 and receives a sound period and silent period from the detecting unit 3. The control unit 6 also receives the number of words from the calculating unit 5. The control unit 6 controls a silent period according to the number of words. Specifically, the more the number of words is, the more the control unit 6 prolongs the silent period; the less the number of words is, the more the control unit 6 shortens the silent period.

Now, a technical significance to control the silent period according to the number of words in the first example will be described. To verify the length of the silent period used to understand an input voice, the inventors carried out a demonstrative experiment described below. First, a plurality of test subjects were made to hear the following three exemplary sentences, the sound period lengths (speech periods) of which were almost the same (about eight seconds) but the number of words of which differed.

First exemplary sentence: Since there isn't much time till delivery. (Number of words: 7)

Second exemplary sentence: Those who fit out client profile of someone looking for something nicer than mass-produced factory-made products. (Number of words: 16)

Third exemplary sentence: The digital camera market has expanded tremendously over the past decade. (Number of words: 11)

Average times taken to actually understand the above exemplary sentences were as follows.

First exemplary sentence: 0.8 second
Second exemplary sentence: 2.5 seconds
Third exemplary sentence: 1.1 seconds These three sentences had the same sound period length but had a different number of words. Although their sound period lengths were the same, silent period lengths taken to understand the input voice were different. Accordingly, it was clarified that if a silent period is added or reduced according to the sound period length, addition of an excess silent period may delay voice processing or addition of a short silent period may make it hard to understand the input voice.

Figure 5:
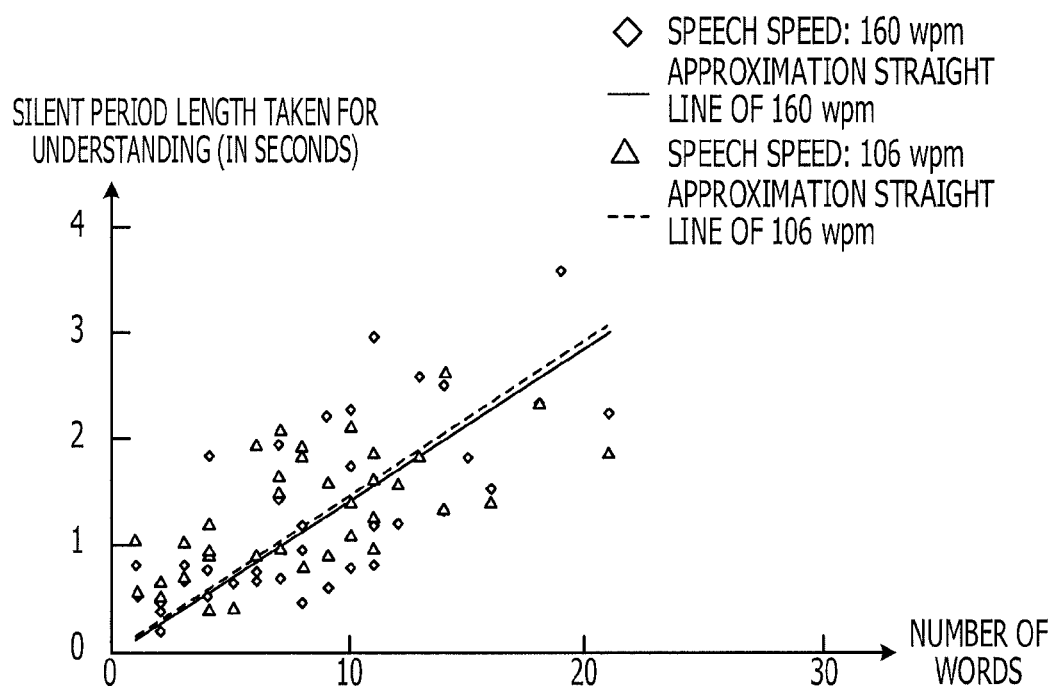
FIG. 5 illustrates a relationship between the number of words included in a sound period and the length of a silent period used for an understanding.

After diligent verification by the inventors, the following finding was clarified. FIG. 5 illustrates a relationship between the number of words included in a sound period and the length of a silent period used for an understanding. Specifically, FIG. 5 illustrates a relationship between the numbers of words in various exemplary sentences or in their clauses or phrases and the lengths of silent periods taken by the test subjects to actually understand. To consider effects by speech speeds, the same exemplary sentence was spoken at different speeds. As illustrated in FIG. 5, the verification by the inventors revealed that the silent period length taken for an understanding is proportional to the number of words, regardless of the speech speed. Thus, when the silent period is controlled according to the number of words, redundant silent periods may be reduced and useful silent periods may be appropriately added. For example, coefficients a and b in the equation below, in which the least squares method is used, may be calculated by using the samples in FIG. 4 as parameters.

$$f(x)=ax+b \quad \text{(Eq. 7)}$$

Coefficients a and b in the above equation in (Eq. 7) take values that minimize err represented by the following equation.

$$err=\Sigma_{i=1}\{Y(i)-f(X(i))\}^2 \quad \text{(Eq. 8)}$$

In the above equation in (Eq. 8), X(i) is an i-th observed value x of the number of words and Y(i) is an i-th observed value y of a silent period length taken for an understanding. The control unit 6 may prestore f(x) in a cache or memory (not illustrated) included in the control unit 6.

The control unit 6 uses x', which indicates the number of words included in a sound period, to control a silent period adjacent to the back end of the sound period so that the silent period becomes f(x'). Thus, it is possible to provide a voice processing device that may suppress a delay in voice processing and enables the user to gain a better understanding of the input voice. The control unit 6 outputs a control signal including the controlled silent period to the outside as an output signal. The control unit 6 may output the output signal to, for example, a speaker (not illustrated) connected to or placed in the voice processing device 1.

Figure 6:
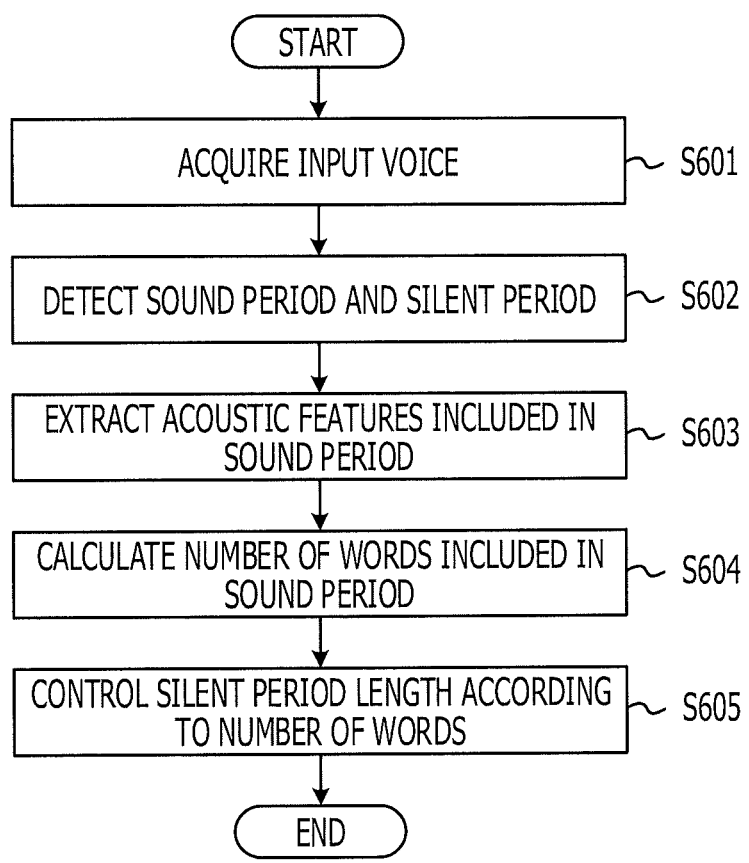
FIG. 6 is a flowchart of voice processing performed by the voice processing device.

FIG. 6 is a flowchart of voice processing performed by the voice processing device 1. The acquiring unit 2 acquires an input voice through a wired circuit or a wireless circuit (step S601). The acquiring unit 2 may also acquire an input voice from a microphone (not illustrated) connected to or placed in the voice processing device 1. Although the input voice is, for example, in English, it may be in a second language. Although the input voice is, for example, in a second language of the user, it may be in the mother language of the user. The acquiring unit 2 outputs the acquired input voice to the detecting unit 3, extracting unit 4, and control unit 6.

The detecting unit 3 receives an input voice from the acquiring unit 2. The detecting unit 3 detects an exhalation period, which indicates a sound period included in the input voice, by using the method described above (step S602). The detecting unit 3 outputs the detected sound period to the extracting unit 4, and also outputs the sound period and silent period to the control unit 6.

The extracting unit 4 receives an input voice from the acquiring unit 2 and also receives a sound period from the detecting unit 3. The extracting unit 4 extracts the acoustic features of the input voice included in the sound period by the above method (step S603). Examples of the acoustic features include the number of moras and the number of sudden power changes. The extracting unit 4 outputs the acoustic features included in the sound period to the calculating unit 5.

The calculating unit 5 receives, from the extracting unit 4, phonological features included in the sound period detected by the detecting unit 3. The calculating unit 5 uses the above method to calculate the number of words included in the sound period according to the acoustic features (step S604). The calculating unit 5 outputs the calculated number of words to the control unit 6.

The control unit 6 receives an input voice from the acquiring unit 2 and receives a sound period and silent period from the detecting unit 3. The control unit 6 also receives the number of words from the calculating unit 5. The control unit 6 controls the silent period length according to the number of words (step S605). Specifically, the control unit 6 controls the silent period length according to f(x), which is an equation representing a relationship between the number x' of words and the silent period length. If the acquiring unit 2 has acquired an input voice at the completion of processing in step S605, the voice processing device 1 repeats processing in steps S601 to S605. If the acquiring unit 2 has not acquired an input voice at the completion of processing in step S605, the voice processing device 1 terminates voice processing illustrated in the flowchart in FIG. 6.

The voice processing device in the first example may suppress a delay in voice processing and enables the user to gain a better understanding of the input voice.

(Second Embodiment)

In the first example, a voice processing device, a voice processing method, and a voice processing program that use the number of moras as acoustic features have been described. In a second example, a voice processing device, a voice processing method, and a voice processing program that use the number of sudden power changes will be described. A functional block diagram of the voice processing device 1 in the second example is similar to the function block diagram in the first example in FIG. 1, so the descriptions below focus on processing differing from the first example. The extracting unit 4 extracts a portion in which power in the input voice is raised in a sound period by a fixed value or more in a fixed time and obtains the number of sudden power changes in the sound period. The extracting unit 4 calculates power p in each fixed time dt in the sound period received from the detecting unit 3 according to the following equation.

$$p(f) = \frac{1}{dt} 10*\log10\left(\sum_{t=f*dt}^{(f-1)*dt-1} s(t)^2\right) \quad \text{(Eq. 9)}$$

where f is a number added in each fixed time dt and s(t) is an input voice, f being any integer that is at least (st/dt) and at most (et/dt), st being a beginning of the sound period, et being the back end of the sound period. The values of st and et may be appropriately set according to the first threshold described above. The fixed time dt is, for example, the number of samples equivalent to 10 ms.

Next, the extracting unit 4 determines whether a change in power p is equal to or more than a fixed value according to the following equation.

$$p'(f) = \begin{cases} 1 & (\text{when}\{p(f) - p(f-1)\} \geq dp) \\ 0 & (\text{when other than the above}) \end{cases} \quad (Eq. 10)$$

In the above equation in (Eq. 10), p'(f) may be referred to as a sudden power change flag. The extracting unit 4 then obtains the number of portions at which a change in power p reaches the fixed value or more as the number Np of sudden power changes according to the following equation.

$$Np = \sum_{f=(st/dt)}^{(et/dt)} p'(f) \quad (Eq. 11)$$

Figure 7:
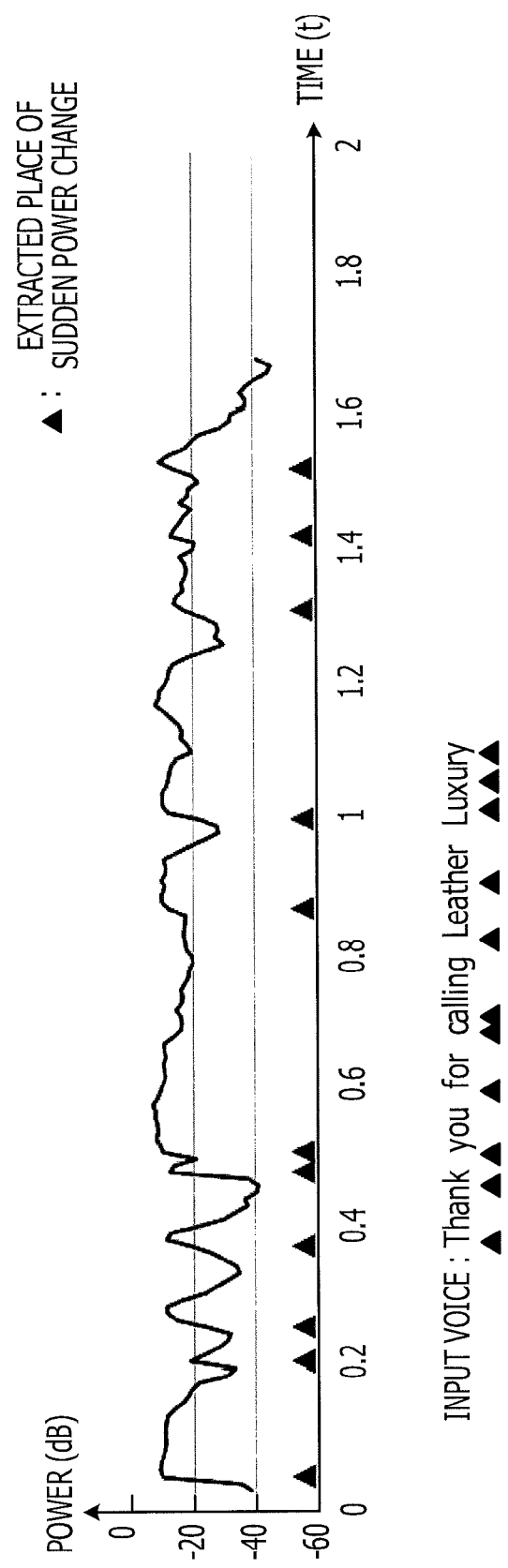
FIG. 7 illustrates a relationship between input voice power and the number of extracted sudden power changes.

The extracting unit 4 outputs the number of sudden power changes, which has been calculated according to the above equation in (Eq. 11), to the calculating unit 5 as acoustic features. FIG. 7 illustrates a relationship between input voice power and the number of extracted sudden power changes. As illustrated in FIG. 7, it may be confirmed that a sudden power change was extracted at a portion at which a change in power p had reached the fixed value or more.

Figure 8:
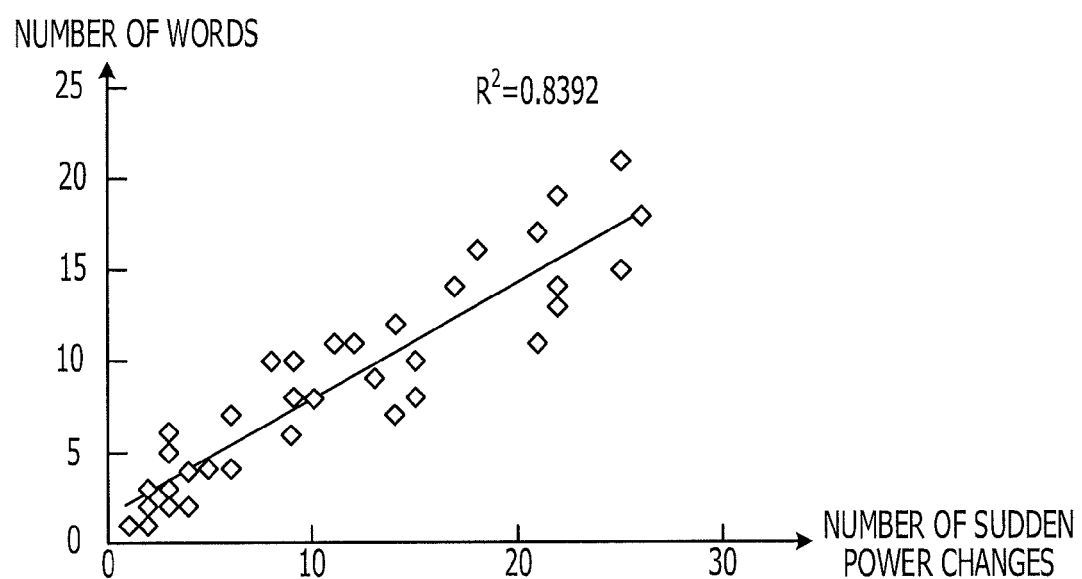
FIG. 8 illustrates a relationship between the number of sudden power changes, which is an example of acoustic features, and the number of words.

FIG. 8 illustrates a relationship between the number of sudden power changes, which is an example of acoustic features, and the number of words. In the relationship in FIG. 8, the number of words was manually extracted from a plurality of exemplary sentences, and the number of sudden power changes associated with each word was also manually extracted. As illustrated in FIG. 8, it was clarified through verification by the inventors that the value of the coefficient $R^2$ of correlation between the number of words and the number of sudden power changes is 0.8 or more, indicating that the correlation is strong. The calculating unit 5 may use this correlation to calculate the number of words. For example, the calculating unit 5 may calculate an inferred number Nw of words from the number Np of sudden power changes received from the extracting unit 4 by using the following equation.

$$Nw = Np \times \alpha + \beta \quad (Eq. 12)$$

The values of α and β may be appropriately set according to the average number of sudden power changes included in one word in the input voice. If the input voice is in English, α and β may be respectively set to, for example, 0.63 and 1.6. The calculating unit 5 outputs the number of words calculated according to the above equation in (Eq. 12) to the control unit 6.

The voice processing device in the second example may suppress a delay in voice processing and enables the user to gain a better understanding of the input voice.

(Third Embodiment)

Figure 9:
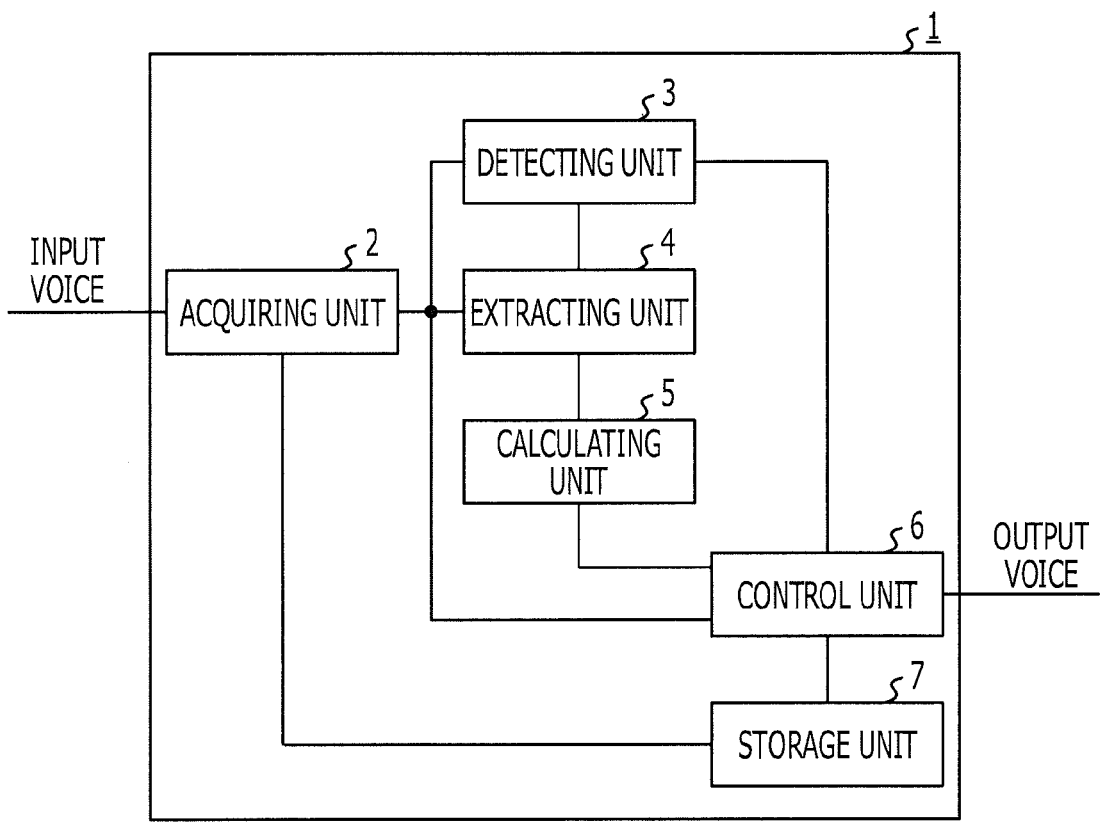
FIG. 9 is a functional block diagram of a voice processing device in a second embodiment.

FIG. 9 is a functional block diagram of a voice processing device 1 in a second embodiment. The voice processing device 1 includes an acquiring unit 2, a detecting unit 3, an extracting unit 4, a calculating unit 5, a control unit 6, and a storage unit 7. The acquiring unit 2, detecting unit 3, extracting unit 4, calculating unit 5, and control unit 6 have the same function as in the first example, so their details will not be described.

The storage unit 7 is, for example, a semiconductor memory such as a flash memory, or a storage unit such as a hard disk drive (HDD) or an optical disk drive. The storage unit 7 is not limited to the above types of storage units; it may be a random-access memory (RAM) or a read-only memory (ROM). Attribute information according to the user's characteristics, a voice including a predetermined number of words, and other various types of data, for example, are stored in the storage unit 7. The storage unit 7 may not be included in the voice processing device 1. For example, the above various types of data may be stored in caches, memories, or the like (not illustrated) in the individual functional units in the voice processing device 1 in a distributed or integrated manner. It is also possible to place the storage unit 7 in an external device other than the voice processing device 1 by using a communication unit (not illustrated) in the voice processing device 1 through a communication line.

A first example of the attribute information according to the user's characteristics is, for example, the user's comprehension to a second language. An example will be exemplified in which a language skill test score is used as a value indicating the comprehension, but it is desirable to note that the length of a language learning period or an age may be used instead of the language skill test score. The voice processing device 1 performs processing described below in advance. First, many test subjects having different scores in arbitrary language skill test hear a plurality of exemplary sentences including different numbers of words, after which the voice processing device 1 measures a silent time taken to understand each sentence. The number of words, a silent time, and a language skill score are taken as one sample indicated in the following equation.

(x, y, s)=(number of words, difference in time, language skill test score) (Eq. 13)

Next, samples are classified into Nr ranks according to the language skill test score s. By using all samples at rank n, coefficients $a_n$ and $b_n$ (n=1, 2, . . . , Nr) in the following equation are calculated by using the least square method.

$$f_n(x) = a_n x + b_n \quad (Eq. 14)$$

In the above equation in (Eq. 14), $a_n$ and $b_n$ take values that minimize the value of err in the following equation.

$$err = \sum_{i=1}^{Rn} \{Y(n,i) - f(X(n,i))\}^2 \quad (Eq. 15)$$

In the above equation in (Eq. 15), Y(n, i) is the value of y in the i-th sample in rank n, and X(n, i) is the value of x in the i-th sample in rank n. Rn is the number of samples in rank n. According to the above equation in (Eq. 15), $f_n(x)$ corresponding to ranks 1 to Nr is prestored in the storage unit 7. When the user uses the voice processing device 1, for example, the user's language skill test score is input by the user. The control unit 6 selects n corresponding $f_n(x)$ from $f_n(x)$ prestored in the storage unit 7 by using the user's language skill test score as a search key. The control unit 6 adds or reduces silent periods adjacent to the back end of the sound period, according to selected $f_n(x)$ and the number of words.

A second example of the attribute information according to the user's characteristics is, for example, the user's comprehension to a second language. If the user is unable to understand another user or an input voice in content while using the voice processing device 1, the user presses a button (not illustrated) or another control connected to the acquiring unit 2. The user presses the control again at a time when the user becomes able to understand the input voice. A period in time between the two presses of the control may be used as the length of a silent period used to understand the input voice to correct the above equation in (Eq. 7). The input voice may be a voice including a predetermined number of words stored in the storage unit 7. In this case, since the number of words is already known, processing performed by the extracting unit 4 to extract acoustic features and processing performed by the calculating unit 5 to calculate the number of words are suppressed, so a processing load on the voice processing device 1 may be further reduced.

The voice processing device in the third example may suppress a delay in voice processing and enables the user to gain a better understanding of the input voice. The voice processing device in the third example may also execute sound processing according to the user's characteristics and may reduce its processing load.

(Fourth Embodiment)

Figure 10:
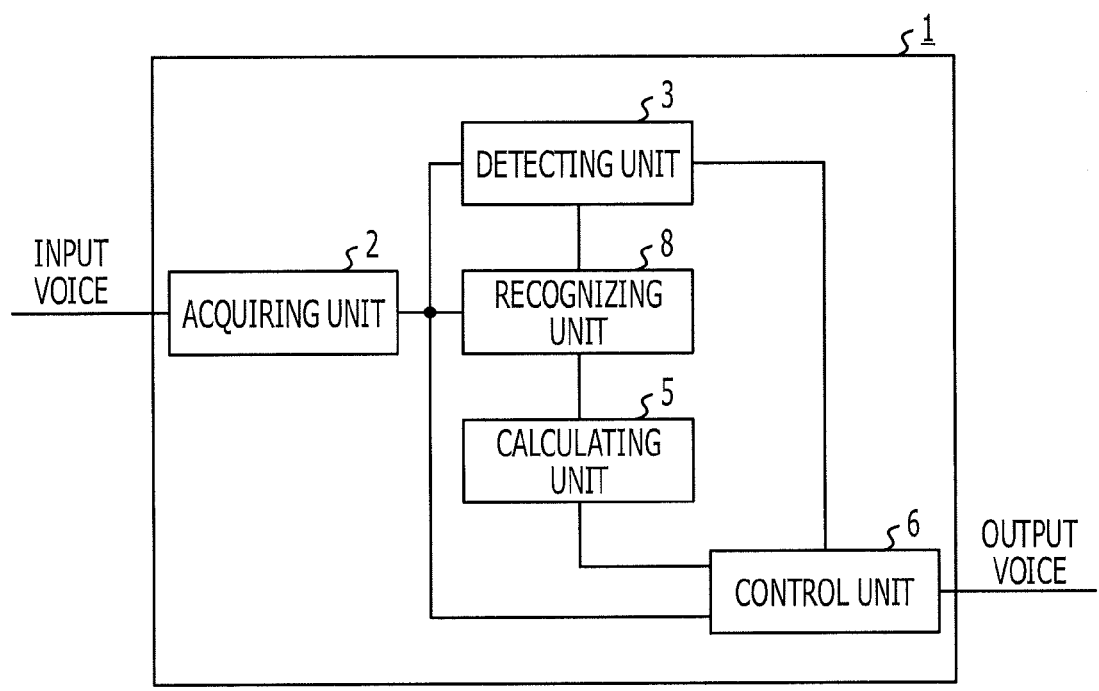
FIG. 10 is a functional block diagram of a voice processing device in a third embodiment.

FIG. 10 is a functional block diagram of a voice processing device 1 in a third embodiment. The voice processing device 1 includes an acquiring unit 2, a detecting unit 3, a recognizing unit 8, a calculating unit 5, and a control unit 6. The acquiring unit 2, detecting unit 3, calculating unit 5, and control unit 6 have the same function as in the first embodiment, so their details will not be described.

The recognizing unit 8 is, for example, a wired logic hardware circuit. Alternatively, the recognizing unit 8 may be a functional module implemented by a computer program executed in the voice processing device 1. The recognizing unit 8 receives an input voice from the acquiring unit 2 and receives a sound period from the detecting unit 3. The recognizing unit 8 recognizes a sound period in an input voice as text information. Specifically, the recognizing unit 8 may use, for example, the voice recognition method described in Japanese Patent No. 5160594. The recognizing unit 8 may also use voice recognition described in Japanese Patent No. 5149941, in which voice recognition is performed for each word included in a sound period, to obtain the number of words in a word set, which is in a recognition process. If the recognizing unit 8 obtains text information by the above voice recognition method, the recognizing unit 8 may recognize the number of words included in the text information by a language processing method described in, for example, Japanese Patent No. 2575125. The recognizing unit 8 outputs the number of recognized words to the control unit 6.

The voice processing device in the fourth example may suppress a delay in voice processing and enables the user to gain a better understanding of the input voice. Since the voice processing device in the fourth example recognizes the number of words included in text information, precision with which the number of words is calculated may be improved, enabling the silent period length to be controlled more accurately.

(Fifth Embodiment)

Figure 11:
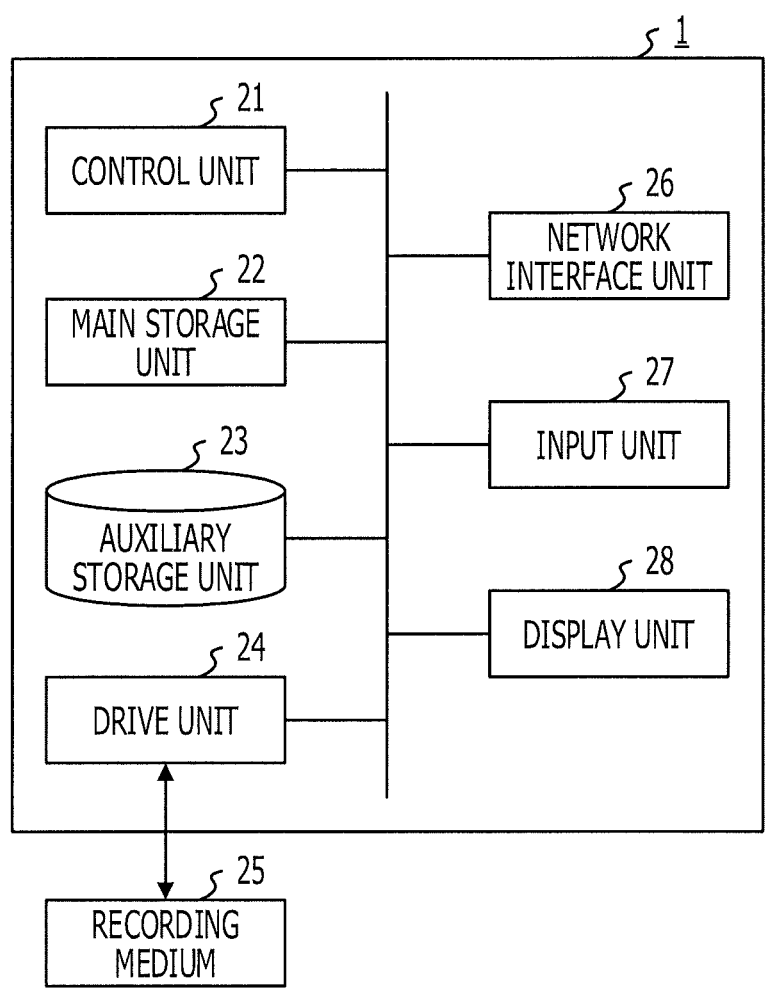
FIG. 11 is the hardware structure of a computer that functions as a voice processing device in an embodiment.

FIG. 11 is the hardware structure of a computer that functions as a voice processing device 1 in an embodiment. As illustrated in FIG. 11, the voice processing device 1 includes a control unit 21, a main storage unit 22, an auxiliary storage unit 23, a drive unit 24, a network interface unit 26, an input unit 27, and a display unit 28. These units are connected through a bus so as to receive and output data among them.

The control unit 21 is a central processing unit (CPU) that controls the units and calculates and processes data in the computer. The control unit 21 also functions as an arithmetic unit that executes programs stored in the main storage unit 22 and auxiliary storage unit 23. Specifically, the control unit 21 receives data from the input unit 27 and a storage unit, calculates and processes the data, and outputs the resulting data to the display unit 28, the storage unit, and the like.

The main storage unit 22 is a ROM or a RAM; it stores or temporarily stores data and programs including an operating system (OS), which is a basic program executed by the control unit 21, and application software.

The auxiliary storage unit 23, which is an HDD or the like, stores data related to the application software.

The drive unit 24 reads a program from a recording medium 25 such as, for example, a flexible disk, and installs the read program in the auxiliary storage unit 23.

A certain program is stored on the recording medium 25. The certain program stored on the recording medium 25 is installed in the voice processing device 1 through the drive unit 24. The installed certain program is executable by the voice processing device 1.

The network interface unit 26 is an interface between the voice processing device 1 and a peripheral unit, having a communication function, that is connected to the voice processing device 1 through a local area network (LAN), a wide area network (WAN), or another network created by data transmission channels such as wired circuits and/or wireless circuits.

The input unit 27 includes a keyboard, which has cursor keys, a numeric keypad, various function keys and the like, and a mouse or a trackpad used to select keys and the like on the display screen of the display unit 28. The input unit 27 also functions as an interface used by the user to give an operation command to the control unit 21 and to enter data.

The display unit 28, which is formed with a cathode ray tube (CRT), a liquid crystal display (LCD) or the like, creates a display according to display data received from the control unit 21.

The voice processing method described above may be implemented as a program executed by a computer. When this program is installed from a server or the like and is executed by the computer, the voice processing method may be implemented.

The voice processing method may also be implemented by recording the program on the recording medium 25. When a computer or mobile terminal reads the recording medium 25, on which the program is recorded, the voice processing method is implemented. Various types of recording media may be used as the recording medium 25; they include a compact disc-read-only memory (CD-ROM), a flexible disk, a magneto-optical disk, and other recording medium that optically, electrically, or magnetically record information and include a ROM, a flash memory, and other semiconductor memories that electrically store information.

(Sixth Embodiment)

Figure 12:
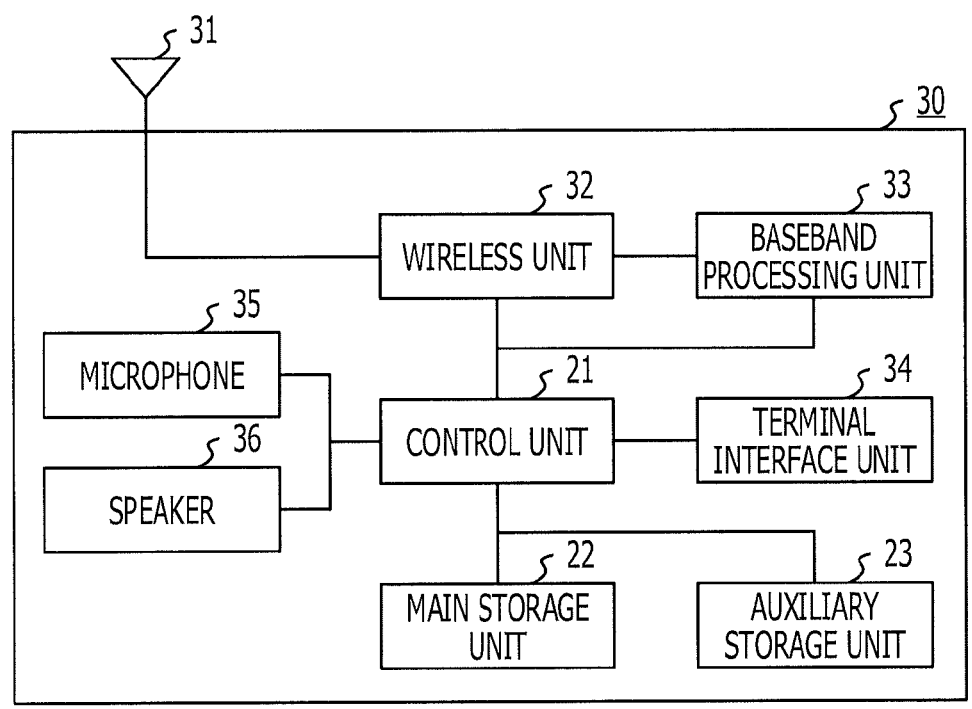
FIG. 12 is the hardware structure of a mobile terminal device in an embodiment.

FIG. 12 is the hardware structure of a mobile terminal device 30 in an embodiment. The mobile terminal device 30 includes an antenna 31, a wireless unit 32, a baseband processing unit 33, a control unit 21, a terminal interface unit 34, a microphone 35, a speaker 36, a main storage unit 22, and an auxiliary storage unit 23.

The antenna 31 transmits a radio signal amplified by a transmission amplifier and receives a radio signal from a base station. The wireless unit 32 converts a transmission signal spread by the baseband processing unit 33 from digital to analog, converts the resulting digital signal to a high-frequency signal through quadrature modulation, and amplifies the converted signal with an electric power amplifier. The wireless unit 32 receives a radio signal, amplifies the received signal, converts the amplified signal from analog to digital, and transmits the resulting digital signal to the baseband processing unit 33.

The baseband processing unit 33 performs baseband processing such as addition of an error correction code to transmission data, data modulation, spread modulation, reverse spread of a received signal, a decision as to a reception environment, a decision as to a threshold for each channel signal, and error correction decoding.

The control unit 21 performs wireless control such as transmission and reception of a control signal. The control unit 21 also executes a signal processing program stored in the auxiliary storage unit 23 or the like to perform, for example, voice processing in the first example.

The main storage unit 22 is a ROM or a RAM; it stores or temporarily stores data and programs including an operating system (OS), which is a basic program executed by the control unit 21, and application software.

The auxiliary storage unit 23 is an HDD, a solid state drive (SSD), or the like; it stores data related to application software and the like.

The terminal interface unit 34 performs adapter processing for data and processing for an interface to a handset and an external data terminal.

The microphone 35 picks up surrounding sounds including voices of a speaking person and outputs them to the control unit 21 as microphone signals. The speaker 36 receives a signal output from the control unit 21 and outputs the signal as an output signal.

The constituent elements of each device described above may not be physically structured as illustrated in the pertinent drawing. Specifically, a specific form of distribution and integration in each device is not limited to the form illustrated in the pertinent drawing; part or all of the device may be functionally or physically distributed or integrated in a desired unit according to various types of loads and the usage status. Various processing described in the above examples may be implemented by executing a program prepared in advance in a personal computer, a workstation, or another type of computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice processing device comprising:
   a hardware processor; and
   a memory which stores a plurality of instructions, which when executed by the hardware processor, causes the hardware processor to execute:
   storing attribute information according to characteristics of a user;
   acquiring an input voice signal;
   detecting a first sound period and a second sound period included in the input voice signal and a first silent period adjacent to a back end of the first sound period and adjacent to a start of the second sound period;
   calculating a number of words included in the first sound period;
   setting a length of a second silent period of an output voice signal based on the attribute information and the number of words; and
   outputting the output voice signal including a third sound period, a fourth sound period and the second silent period adjacent to a back end of the third sound period and adjacent to a start of the fourth sound period, the words included in the first sound period of the input voice signal being outputted in the third sound period and words included in the second sound period of the input voice signal being outputted in the fourth sound period.

2. The device according to claim 1,
   wherein the attribute information is at least one of a language skill test score of the user, a length of a period of language learning by the user, an age of the user, and a time taken by the user to respond to a voice.

3. The device according to claim 2,
   wherein the acquiring further acquires a response input from the user,
   wherein the time taken by the user to respond to a voice is a time from termination of the third sound period to a response input by the user.

4. The device according to claim 1, further comprising:
   extracting acoustic features included in the first sound period,
   wherein the calculating calculates the number of words included in the first sound period according to the acoustic features.

5. The device according to claim 4,
   wherein the acoustic features are one of a number of moras included in the first sound period and a number of sudden power changes included in the first sound period.

6. The device according to claim 1,
   wherein the detecting detects a ratio of signal power to noise from a plurality of frames included in the input voice signal,
   wherein the detecting detects frames for which the ratio of signal power to noise is equal to or greater than a first threshold as the first sound period, and
   detects frames for which the ratio of signal power to noise is smaller than the first threshold as the first silent period.

7. The device according to claim 1,
   wherein the setting sets the second silent period where the larger is the number of words, the longer is the second silent period, and where the smaller is the number of words, the shorter is the second silent period.

8. The device according to claim 1,
   wherein the acquiring acquires a voice signal including a predetermined number of words as the input voice signal.

9. The device according to claim 1, further comprising:
   recognizing the input voice signal as text information,
   wherein the calculating calculates the number of words according to the text information.

10. A voice processing method comprising:
  storing attribute information according to characteristics of a user;
  acquiring an input voice signal;
  detecting a first sound period and a second sound period included in the input voice signal and a first silent period adjacent to a back end of the first sound period and adjacent to a start of the second sound period;
  calculating, by a computer processor, a number of words included in the first sound period;
  setting a length of a second silent period of an output voice signal based on the attribute information and the number of words; and
  outputting the output voice signal including a third sound period, a fourth sound period and the second silent period adjacent to a back end of the third sound period and adjacent to a start of the fourth sound period, the words included in the first sound period of the input voice signal being outputted in the third sound period, and words included in the second sound period of the input voice signal being outputted in the fourth sound period.

11. The method according to claim 10,
  wherein the attribute information is at least one of a language skill test score of the user, a length of a period of language learning by the user, an age of the user, and a time taken by the user to respond to a voice.

12. The method according to claim 11,
  wherein the acquiring further acquires a response input from the user,
  wherein the time taken by the user to respond to a voice is a time from termination of the third sound period to a response input by the user.

13. The method according to claim 12, further comprising:
  extracting acoustic features included in the first sound period,
  wherein the calculating calculates the number of words included in the first sound period according to the acoustic features.

14. The method according to claim 10,
  wherein the acoustic features are one of a number of moras included in the first sound period and a number of sudden power changes included in the first sound period.

15. The method according to claim 10,
  wherein the detecting detects a ratio of signal power to noise from a plurality of frames included in the input voice,
  wherein the detecting detects frames for which the ratio of signal power to noise is equal to or greater than a first threshold as the first sound period, and
  detects frames for which the ratio of signal power to noise is smaller than the first threshold as the first silent period.

16. The method according to claim 10,
  wherein the setting sets the second silent period where the larger is the number of words, the longer is the second silent period, and where the smaller is the number of words, the shorter is the second silent period.

17. A non-transitory computer-readable storage medium storing a voice processing program that causes a computer to execute a process comprising:
  storing attribute information according to characteristics of a user;
  acquiring an input voice signal;
  detecting a first sound period and a second sound period included in the input voice signal and a first silent period adjacent to a back end of the first sound period and adjacent to a start of the second sound period;
  calculating a number of words included in the first sound period;
  setting a length of a second silent period of an output voice signal based on the attribute information and the number of words; and
  outputting the output voice signal including a third sound period, and fourth sound period and the second silent period adjacent to a back end of the third sound period and adjacent to a start of the fourth sound period, the words included in the first sound period of the input voice signal being outputted in the third sound period, and words included in the second sound period of the input voice signal being outputted in the fourth sound period.

18. A mobile terminal device comprising:
  a microphone configured to receive an input voice of a speaking person and generate an input voice signal;
  a memory storing attribute information according to characteristics of a user;
  a hardware processor coupled to the memory and configured to
    receive the input voice signal from the microphone,
    detect a first sound period and a second sound period included in the input voice signal and a first silent period adjacent to a back end of the first sound period and adjacent to a start of the second sound period,
    calculate a number of words included in the first sound period,
    set a length of a second silent period of an output voice signal based on the attribute information and the number of words,
    output the output voice signal including a third sound period, a fourth sound period and the second silent period adjacent to a back end of the third sound period and adjacent to a start of the forth sound period; and
  a speaker device configured to output an output voice based on the output voice signal.

* * * * *